United States Patent
Williams

(10) Patent No.: US 7,391,939 B1
(45) Date of Patent: Jun. 24, 2008

(54) OPTICAL APPARATUS

(76) Inventor: Raymond W. Williams, 5126 W. Farm Rd. 148, Springfield, MO (US) 65802

( * ) Notice: Subject to any disclaimer, the term of this patent is extended or adjusted under 35 U.S.C. 154(b) by 188 days.

(21) Appl. No.: 11/281,122

(22) Filed: Nov. 17, 2005

Related U.S. Application Data

(60) Provisional application No. 60/628,739, filed on Nov. 17, 2004.

(51) Int. Cl.
G02B 6/00 (2006.01)

(52) U.S. Cl. .................... 385/31; 385/33; 385/129; 385/146

(58) Field of Classification Search ............ None
See application file for complete search history.

(56) References Cited

U.S. PATENT DOCUMENTS

| | | | |
|---|---|---|---|
| 3,379,394 A | 4/1968 | Bialy | |
| 3,780,722 A | 12/1973 | Swet | 126/270 |
| 4,026,267 A | 5/1977 | Coleman | 126/270 |
| 4,292,959 A | 10/1981 | Coburn, Jr. | 126/686 |
| 4,302,069 A | 11/1981 | Niemi | 385/46 |
| 4,344,417 A | 8/1982 | Malecek | 126/439 |
| 4,411,490 A | 10/1983 | Daniel | 350/96.1 |
| 4,425,907 A | 1/1984 | Younghouse | 126/685 |
| 4,505,264 A | 3/1985 | Tremblay | 126/439 |
| 4,529,830 A | 7/1985 | Daniel | 136/246 |
| 4,539,625 A | 9/1985 | Bornstein | 362/576 |
| 5,268,985 A | 12/1993 | Ando et al. | 385/129 |
| 5,877,874 A | 3/1999 | Rosenburg | 359/15 |
| 6,021,007 A | 2/2000 | Murtha | 359/834 |
| 6,147,804 A | 11/2000 | Kashima et al. | 359/599 |
| 6,272,265 B1 | 8/2001 | Franklin | 385/31 |
| 6,425,391 B1 | 7/2002 | Davoren et al. | 126/683 |
| 6,630,622 B2 | 10/2003 | Konold | 136/246 |
| 6,700,055 B2 | 3/2004 | Barone | 136/246 |
| 6,744,960 B2 * | 6/2004 | Pelka | 385/130 |
| 6,899,097 B1 | 5/2005 | Mecham | 126/591 |
| 6,908,204 B2 | 6/2005 | Kraft | 362/31 |
| 6,957,650 B2 * | 10/2005 | Nyhart et al. | 126/600 |
| 7,164,839 B2 * | 1/2007 | Nyhart et al. | 385/131 |

* cited by examiner

*Primary Examiner*—Sung H Pak
(74) *Attorney, Agent, or Firm*—Jonathan A. Bay

(57) ABSTRACT

A laterally- and longitudinally-elongated sheetform of optical material has a core and spaced broad surfaces provided with superficial light-confining measures flanking the core. At least one broad surface has an array of converging lenses, each adapted for collecting and introducing incident light rays into the core unimpeded by the superficial light-confining measures, and converging the rays onto focal points within the web. A counterpart array of reflective elements are embedded in the web at the focal points, and arranged to deflect the collected, converged rays onto transmission paths through the web generally intermediate the broad surfaces. A light-emission port provided in or by the web which is also rendered substantially free of impedance by the superficial light-confining measures. That way, collected light is generally confined between the broad surfaces, except for emissions out the emission port.

20 Claims, 10 Drawing Sheets

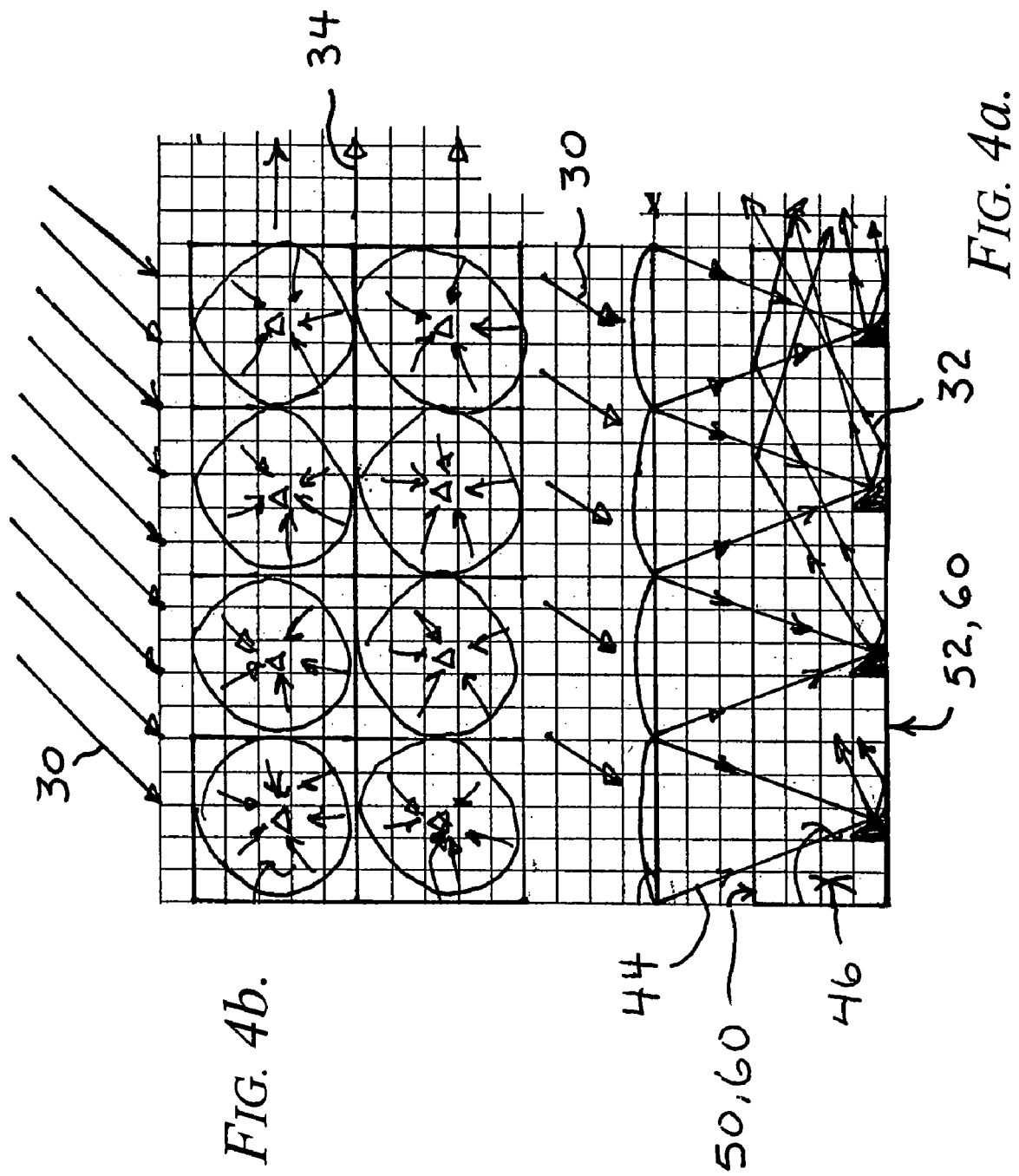

OPTICAL APPARATUS

CROSS-REFERENCE TO PROVISIONAL APPLICATION(S)

This application claims the benefit of U.S. Provisional Application No. 60/628,739, filed Nov. 17, 2004, which is fully incorporated herein by this reference.

BACKGROUND AND SUMMARY OF THE INVENTION

The invention generally relates to passive optical apparatus and, more particularly, to a sheetform optical apparatus providing an expansive surface for collecting external light, deflecting and propagating such through its core for delivery to one or more emission ports, which might be relatively diminutive and hence deliver the collected input in concentrated form.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 4a is an elevational sectional view comparable to FIG. 2 or 3 except showing an additional embodiment of the invention;

FIG. 4b is a top plan view thereof;

DETAILED DESCRIPTION OF THE PREFERRED EMBODIMENTS

Figure 1:
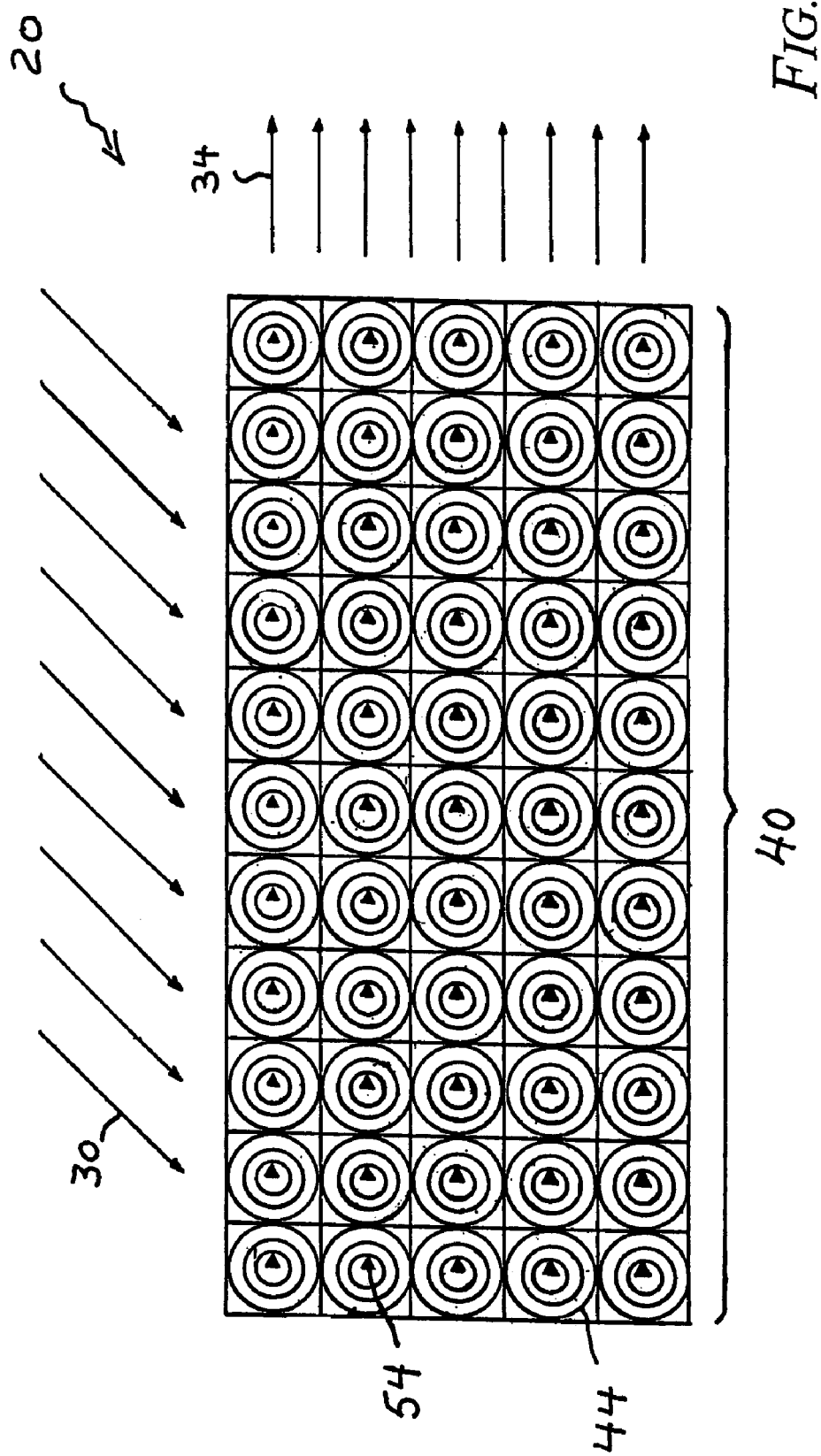
FIG. 1 is a top plan view of optical apparatus in accordance with the invention.

The drawings show several embodiments of an optical apparatus 20 in accordance with the invention. Briefly, it comprises a web of optical material arranged for achieving preferably the three following objectives. Namely, it preferably 1) collects external (incident) light 30 by a distributed array 40 of lens collectors 42 or 44, then 2) confines such collected light 32 within the core of the web (eg., the lens-focused light rays are deflected at right angles or so for transmission in the plane of the core), and ultimately 3) distributes the collected-confined light 32 to one or more light-emission ports 55 or 56 remote from the light-collecting lenses 42 or 44. The light-emission ports 55 or 56 deliver the light 32 to what is referred herein as an end-application or end-utilization. For example and without limitation, the light-emission port or ports 55 or 56 might simply be fashioned to shine back the collected light 32 to the environment from which it was collected in the first place (eg., 34, but perhaps modified, such as more intense or a different color). For sake of another example, the light-emission ports 55 might transfer the collected light 32 to light-conducting pipes or media for ultimate end-utilization elsewhere, some of which possible end-use utilizations will be described more particularly below. In the previous case, the light-conducting pipes are the end-utilization from the inventive optical apparatus 20's perspective, but the light-conducting are truly an intermediate utilization, because there are further utilizations downline.

Figure 2:
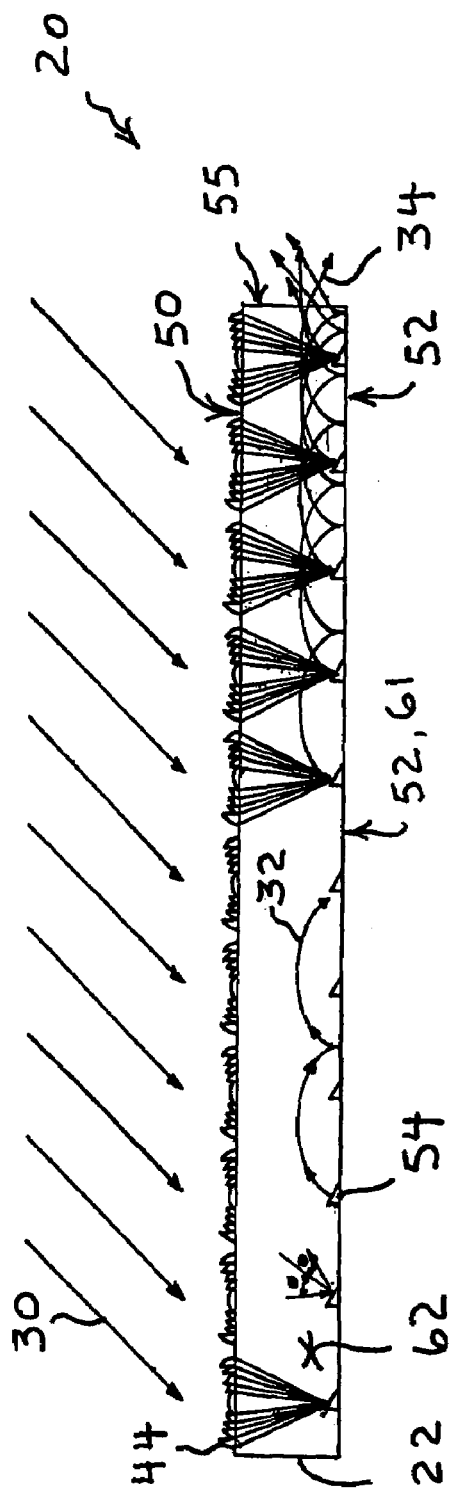
FIG. 2 is an elevational sectional view taken along a vertical line of symmetry through FIG. 1.

The web (eg., 22) of optical material can be reckoned as a sheet, or a sheetform 22, having two broad surfaces 50 and/or 52 spaced by a thickness. FIG. 2 shows one preferred non-limiting example of thickness might be and without limitation about five mm (~0.20 inches) or so. However the thickness might be scaled up or down as desired. Indeed the thickness might be scaled up so far as to be more commonly reckoned as a plate or slab (or form variants thereof). For convenience in this written description, this material stock will generally be referred to as a sheetform 22 for consistency's sake.

Whereas various embodiments of the invention will be described more particularly below, generally the optical apparatus 20 in accordance with the invention can be reckoned as comprising the following basic aspects. That is, the optical apparatus 20 comprises a laterally- and longitudinally-elongated expanse of sheetform 22 optical material. Accordingly, the sheetform 22 has spaced broad surfaces 50 and/or 52 spaced apart by a chosen thickness. The spaced broad surfaces 50 and/or 52 flank a core 46 or 62. The sheetform 22 is provided with superficial light-confining measures 60-62. The term "superficial" as used in this written description connotes properties associated either or both of the broad surfaces 50 and/or 52 of the sheetform material, or its interior (eg., subsurface). Since by preference the optical apparatus 20 is preferably produced in as thin as sheetform 22 as gets by for the purpose, any variances in properties including optic properties which vary from surface to interior are necessarily going to be proximate one surface or another. In other words, preferably for the sake of conserving material, even there very core of the sheetform 22 is fairly proximate both surfaces.

Given the foregoing, the superficial light-confining measures 60-62 might be achieved either as coverings or properties for confining light 32 between the broad surfaces 50 and/or 52 of the sheetform 22, and therefore do so by any of internal reflection, internal refraction, or a combination thereof.

Between internal reflection and internal refraction, internal reflection is achieved by least costly production methods.

One way to achieve internal reflection is to the cover the broad surfaces 50 and/or 52, or at least one such surface, with a coating 60 of a reflector. Usually a suitable reflector comprises a metal layer including without limitation silver or the like. Preferably such a coating 60 of such an opaque reflector is not applied over the lenses 42 or 44 or emission ports 55 or 56.

A more costly but advanced covering comprises a cladding 61 of an optical material that has a refractive index lower than that of the core 46 (eg., a core 46 with presumptively a uniform index of refraction). There are several options, with achieving such a cladding 61. First, air suffices as a cladding 61, because air has just about the lowest index of refraction possible, which is very nearly unity, the index of refraction for a vacuum. Hence one option is leave the core 46 bare and exposed in dry air.

Problems with leaving the core 46 bare and relying on dry air as the cladding 61 include that include, in some use environments, air is not always dry. If any film of moisture or water forms on the bare core 46, then very likely it will leak light and not reflect all the light back into the core 46. So, a second option includes sealing the exposed core 46 off in an airtight sealed compartment. Air still is the cladding material 61 for the core 46 but at least the air is trapped in an airtight compartment, to keep moisture out. A third option includes actually depositing a material layer on the core. The material layer preferably comprises an optic material that has a very low index of refraction, though not nearly so low as air. This is how some fiber optic cables are constructed. That is, instead of relying on air as the cladding layer 61, an actual material layer is relied for because it is more trustworthy for providing a dependable and consistent interface. With air as the cladding layer, there is a constant battle with fighting off the possibility of moisture creeping into the systems somehow.

Whatever is utilized as the cladding layer 61, propagating light 32 is substantially confined in the high-refractive index core 46 because when light 32 impinges on the interface with the cladding 61 of the low-refractive index material the light 32 reflects back into the high-refractive index core 46. Only so long as, that is, the light 32 impinges the cladding 61 at an angle shallower than the critical angle. Briefly, the critical angle is the divide where the impinging light 32 either reflects (bounces) off the interface or else transmits through the interface, and thereby escaping into the material of the cladding 61. But of course the light 32 will refract at the interface, which means light bends at the interface and then also speeds up or down in the material of the cladding 61. Again, at steep angles above the critical angle, light will escape out into the cladding layer 61. At shallower angles of attack, light will continuously bounce down a path between one interface of the cladding 61 and the other, with very low losses of power.

With a cladding 61 of a low-index refractive material, preferably at least only emission ports 56 formed in the broad surfaces 50 and/or 52 are excluded from being covered with such a cladding layer 61. The lens 44 could be covered by such a cladding layer 61 and still introduce light to the core 46. External light 30, especially rays along the lenses' principal axes, will transmit through such a cladding layer 61. Also, emission ports 55 formed along the sheetform 22's peripheral edges could be covered by such a cladding layer 61. Presumptively, interior light 32 will be encounter such peripheral edges well above the critical angle. But emission ports 56 formed in the broad surfaces 50 and/or 52 will have to be cleared free of the cladding layer 61. A convenient way to fabricate such emission ports 56 is to cover the whole apparatus 20 with the cladding 61 layer and then, wherever an emission port 56 is desired, the outline of the emission port 56 is recessed through the cladding layer 61 to expose the interior, high-refractive index core 46.

A refinement beyond internal reflection involves the phenomenon of internal refraction. To achieve internal refraction, preferably the sheetform 22, at least along one broad surface 50 or 52 thereof, is fabricated with a refractive-index gradient. The refractive-index gradient preferably varies from a low refractive index near the surface to a high refractive index interior thereof, in the direction of the core 62 (eg., a core 62 having not a uniform but gradient refractive index). The physics of internal refraction might be better described by reference to this classroom experiment. Now, this classroom experiment is described by many sources. Its conception is attributed to one William M. Strouse, who sought to demonstrate internal refraction by earth's atmosphere.

So, to visually demonstrate internal refraction, one only need to step through the following classroom experiment. This experiment would show the gradual and continuous bending of light due to a gradient in the optical density of any medium (eg., the sheetform 22 of the optical apparatus 20 in accordance with the invention, or the atmosphere, and so on). In the experiment, the medium with a refractive-index gradient is sugar water in an aquarium tank. The experiment has to be set up such that the sugar water, instead of being evenly mixed, has a vertical gradient in concentration of sugar. External light is provided by a high intensity beam, including without limitation Helium-Neon laser from anywhere in the two to thirty-five mW range of power. This experiment also shows not only internal refraction but also internal reflection as well as another phenomenon referred to as refocusing.

To set up the experiment, a long narrow plastic tank is filled two-thirds full of warm water. The water should be adulterated with a light-scattering substance, and this very simply might be milk. Sugar cubes are added to the tank and allowed to dissolve undisturbed. The dissolving sugar establishes a strong gradient in the index of refraction ranging from a factor of 1.50 (84% sugar at the bottom of the tank) to a factor of 1.33 (pure water, a few centimeters off the bottom). The laser beam is aimed through an end of the tank, directed horizontally parallel with the bottom of the tank, and at an elevation about a couple of centimeters or so above the bottom.

Given this set-up, the laser light will enter the tank horizontally but be refracted downward in an arc by the gradient in the refractive index of the sugar water. Ultimately the downward arcing laser light will land on the plastic-air interface at the bottom of the tank, and then "bounce" back up by virtue of internal reflection. Following the upward bounce, the laser light will follow the course of a succeeding arc, climbing ever so much more shallowly until it reaches a zenith from where it arcs back down by "internal refraction." It will bounce again at the plastic-air interface at the bottom of the tank, arc upward and back down by internal refraction, and so on, to the opposite end of the tank, like the trace of numerous bounces of a thrown ball. Depending on the gradient that has been established in the tank (and the angle and height at which the laser light enters the tank), the laser light may bounce anywhere from once to several times in the length of a meter-long tank.

Purportedly, closer observation would reveal another interesting effect, namely, that of defocusing (divergence) of the laser light as it arcs downward toward the higher refractive sugar water, followed by refocusing as it arcs upward. This effect is only experienced in the vertical direction (direction of the gradient) and not in the horizontal, and is periodic with every bounce.

Evidently this experiment must be set up with some care. The tank of sugar water must should prepared at least twenty-four hours before intended use to allow enough time for all the sugar to completely dissolve. The tank should be filled to about two-thirds full of warm water. A few drops of milk should be stirred in to make the scattering of laser light visible. Purportedly, not much milk is needed. If too much milk is added (eg., the water looks cloudy, "milky"), then the laser light will be overly attenuated (appearing weakened, by being scattered out of path) and no longer visible by the time it reaches the opposite end of the tank. However, the proper perspective of what is the right amount of milk is simple to understand. If an ordinary observer can't see through the ends of the tank, then neither will a laser likely shine through it. The tank is simply too cloudy. After having discerned the proper concentration of milk, those parties who are wishing to conduct this experiment should drop in sugar cubes until about fifth percent (50%) of the bottom area of the tank is evenly covered with cubes. It is expected that the cubes will start dissolving immediately, but it takes a long time for them to dissolve completely. So parties conducting this experiment are advised to wait a long time (eg., twenty-four hours) before conducting the experiment because any undissolved sugar remaining on the bottom as this will spoil the "bounce" of the laser light.

Once the gradient has been established, it will be somewhat stable for some time, albeit not for more than a day or two. Best results are obtained twenty-four (to perhaps thirty) hours after preparation. The experiment will still work even after two to three days. However, parties can expect fewer bounces with increasing time as the sugar diffuses more thoroughly throughout the tank (namely, upwards) and slowly degrades the gradient.

A more impressive way to conduct this experiment might include substituting corn syrup for the sugar and about a one-hundred mW Argon laser for the Helium-Neon laser. The corn syrup and the Argon laser combination provides a surprise. It turns out that corn syrup fluoresces yellow when excited by blue/green laser light. As the Argon beam arcs downward, it appears to turn yellow in color. When it bounces off the bottom, it becomes blue/green again as it arcs upward. And this happens with every bounce. Hence the changes or gradations of the color visually map the otherwise-invisible gradations in corn syrup concentration, and likewise the otherwise-invisible refractive-index gradient as well.

Figure 3:
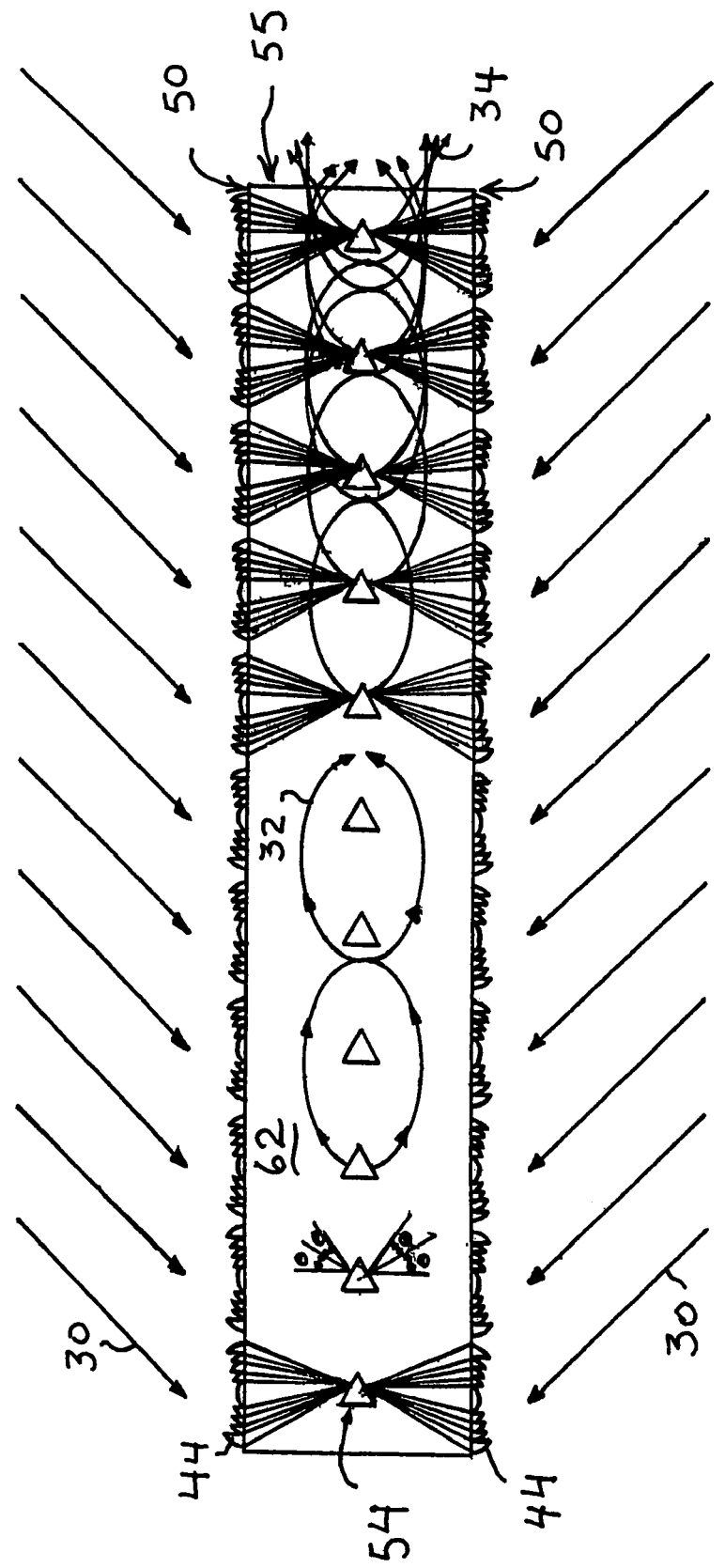
FIG. 3 is a sectional view comparable to FIG. 2 except showing an alternate embodiment of the invention.

To turn back to FIGS. 1 through 6b, the optical apparatus 20 in accordance with the invention furthermore comprises a plurality of converging lenses 42 or 44. In FIGS. 1-2 and 4a-6b, the lenses 42 or 44 are distributed across just one broad surface 50 of the sheetform 22. In FIG. 3, the lenses 42 are distributed across both broad surfaces 50. That way, the optical apparatus in accordance with the invention can collect external light 30 from two different directions simultaneously. These lenses 42 might be Fresnel lenses or the like. In any event, each lens 42 is adapted for collecting and introducing incident light rays into the lenses 42 or 44 generally unimpeded by the superficial light-confining measures 60-62. The lenses 42 furthermore function to converge the collected external light onto a focal point or a near focal point within the sheetform 22.

The optical apparatus 20 in accordance with the invention moreover comprises a counterpart plurality of reflective elements 54. The reflective elements 54 are embedded within the sheetform 22 and preferably disposed at the focal point or near focal point for the plurality of lenses 42 or 44. Such reflective elements 54 can comprise an embedded facet 54 that is coated with a reflector material such as a metal or the like. Alternatively, such reflective elements 54 just might comprise wedges of solid metal. The reflective elements 54 are arranged to deflect the collected (and converged) light rays onto transmission paths through the lenses 42 or 44 of the sheetform 22, or at least generally intermediate the broad surfaces 50 and/or 52 thereof.

The optical apparatus 20 in accordance with the invention additionally comprises at least one light-emission port 55 or 56. Such a light-emission port 55 or 56 is either formed in a broad surface (eg., 56), or otherwise might be a polished edge of the sheetform 22 (eg., 55). Regardless, the objective is to provide such light-emission ports 55 or 56 so that they are generally free of the impedance of the light-confining measures 60-62. That way, the light-confining measures 60-62 generally confine the introduced light 32 between the broad surfaces 50 and/or 52, except for emissions out the emission ports 55 or 56.

Figure 11:
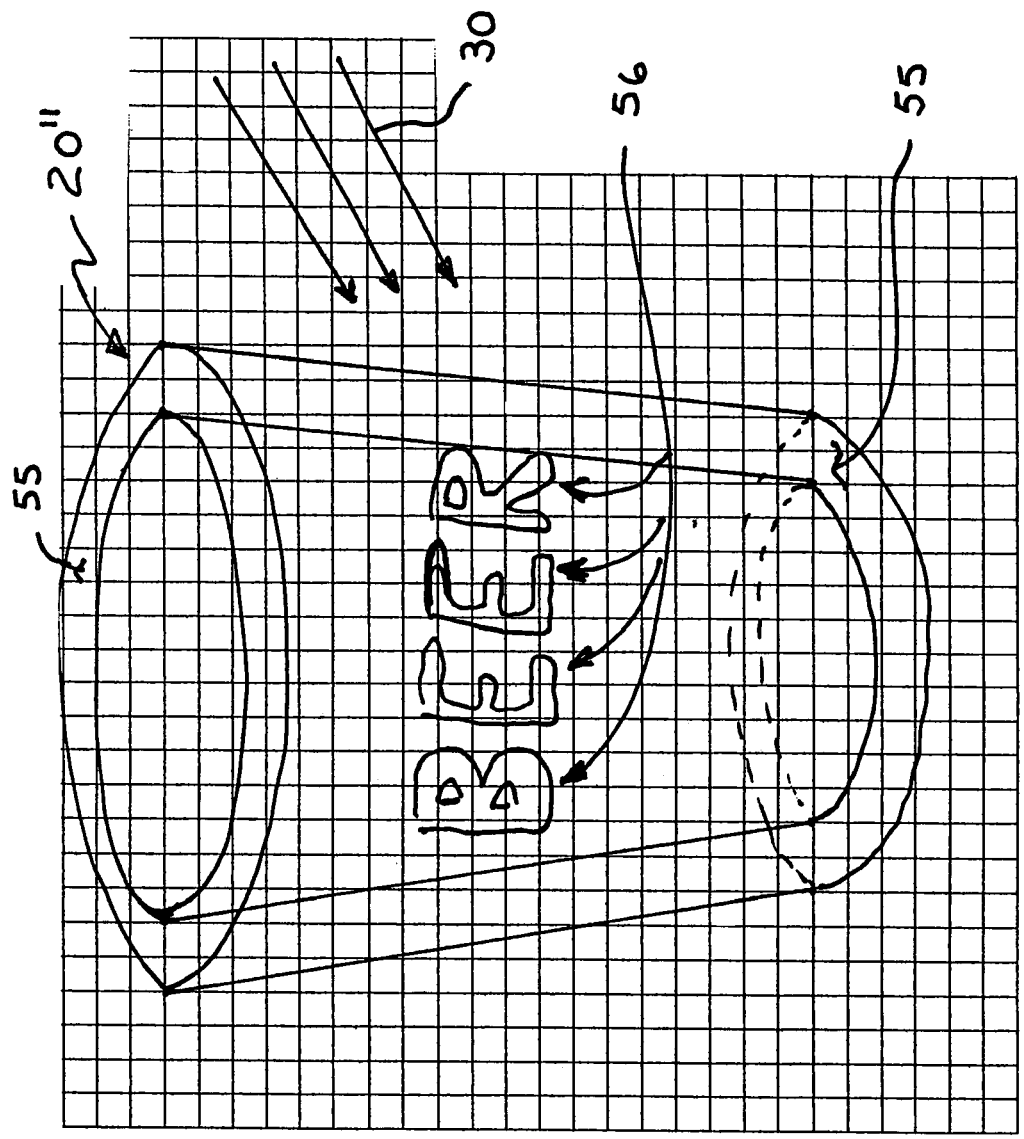
FIG. 11 is a perspective view of the optical apparatus in accordance with the invention fashioned into an arbitrary hardgood such as, more particularly, a drinking vessel.

FIGS. 2, 3, 4b, 5b and 6b show, among other things, that the alignment of the reflective elements 54 at least initially launches the introduced light rays in a general direction of the emission port or ports 55. However, the guidance of the introduced light 32 to the emission port or ports 55 is furthermore advanced in part by the optical material's light-confining measures 60-62, as well as in still other part by the physical contour of the sheetform 22. That is, there is no requirement that the sheetform 22 be perfectly flat. It can be curved or warped. Indeed, FIG. 11 shows the optical apparatus $20^{11}$ in accordance with the invention fashioned into an arbitrary hardgood such as, more particularly, a drinking vessel. This drinking vessel $20^{11}$ is illuminated by external light 30 and in consequence thereof glows at selected emission ports 55 and 56 at least faintly distinct from the external light 30 which powers such illumination. For example, the emission ports 56 might comprise the lettering on the outer broad face of the drinking vessel $20^{11}$. The emission ports 55 might furthermore comprise the upper rim-edge of the drinking vessel $20^{11}$.

The optical material of the sheetform 22 might be further provided with spectral absorption properties for subtracting or diminishing a spectrum or color of the collected incident light 32 before emission thereof out the emission port 55 or 56. That way, the drinking vessel $20^{11}$ might collect white light 30 but glow red (or the like) at the lettering and rim. In consequence, the emitted light 34 is not necessarily stronger than the external light 30, it simply is distinguishable by being a different color.

Figure 8:
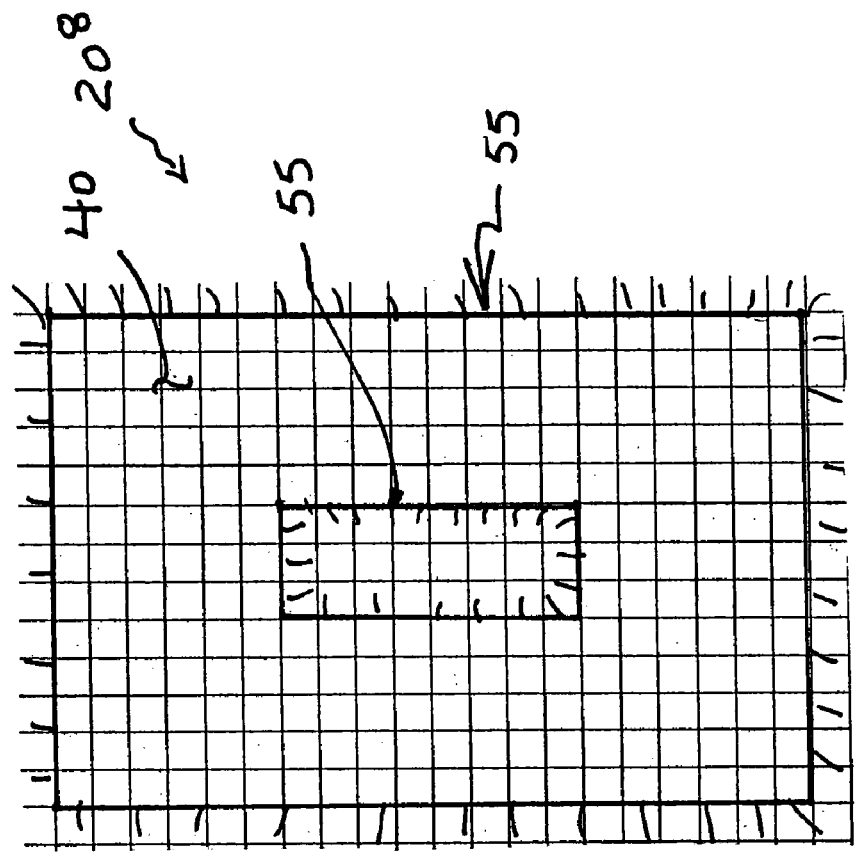
FIG. 8 is a front elevational view of the optical apparatus in accordance with the invention fashioned into a wall plate for an electrical switch.
Figure 7:
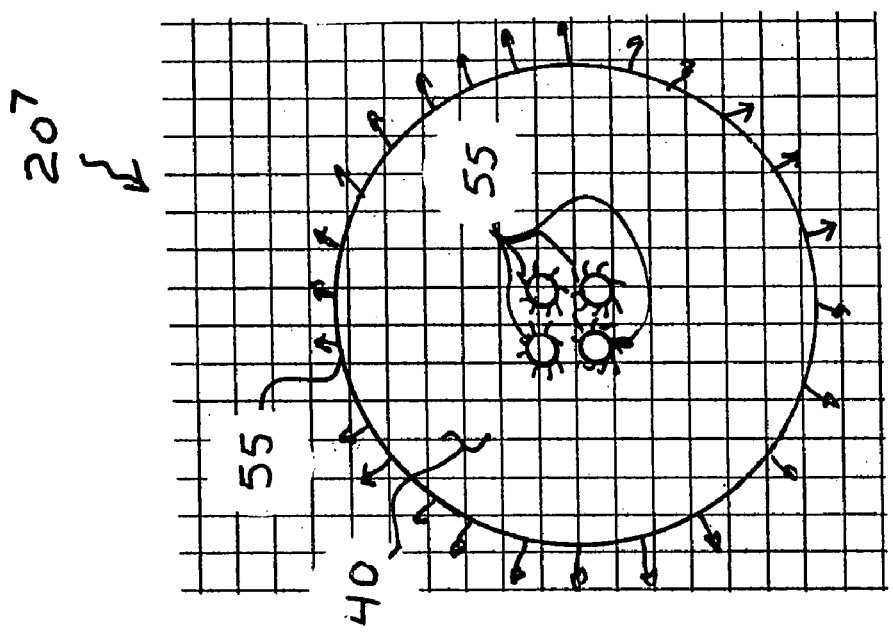
FIG. 7 is a front elevational view of the optical apparatus in accordance with the invention fashioned into a jacket button.

Likewise with FIG. 7, which shows the optical apparatus $20^7$ in accordance with the invention fashioned into a jacket button. The emission ports 55 thereof might not glow brighter than the external light 30, but be distinguishable by glowing at a different color. Conversely, the emission ports 55 can be scaled to account for a relatively diminutive outlet area compared to the surface area that the lenses 42 account for. FIG. 8 shows the optical apparatus $20^8$ in accordance with the invention fashioned into a wall plate for an electrical switch. The wall plate $20^8$ might collect external light 30 over a broad area but emit the introduced external light just along thin strips at its interior and exterior borders. That way, external light 30 in a dimly lit environment might be concentrated and strengthened to cause the emission ports 55 to glow more brightly in such a dimly lit environment.

Again, emission ports 56 formed in the broad surfaces 50 and/or 52, like the lettering in FIG. 11, are preferably formed by recesses sufficiently deep through the superficial light-confining measures 60-62 to be generally free of impedance therefrom. Conversely, emission ports 55 comprising edges of the sheetform 22 will already be substantially free of impedance from the light-confining measures 60-62.

Pause can be taken now to comment on further aspects of the invention. FIGS. 1 and 2 show incident light being focused on reflective facets 54 by Fresnel-type lenses 42. The combination of a collecting lens with its associated reflective facet comprises a cell. The angle of the reflective facet 54 is set to reflect focused light 32 into the core 62 of the material or, more accurately, within the refractive-index gradient in the material. The reflected light 32 propagates within the refractive-index gradient by total internal refraction within the core 62 (eg., toward the incident broad surface 50), except for total internal reflection where it "bounces" against the opposite broad surface 52. The light 32 propagated by each cell is additive with all the other cells such that light 32 propagated to the right-edge of the sheetform 22 (eg., right in the view of FIG. 2) is a concentration of the contributions of all the cells. In FIG. 2, the collected light 32 is delivered to the right edge, which is the emission port 55 for this sheetform 22 of optical material. The emitted light 34 can be transferred to other devices for utilization in applications other than simply causing the right edge to illuminate. In this embodiment, only the bottom broad surface 52 (eg., bottom in FIG. 2) directly participates in light-confining work. In contrast, the other broad surface 50 (ie., formed with the lenses 42) is not directly involved in light-confining work.

FIG. 3 shows the sheetform 22 of optical material formed Fresnel-type lenses 42 on both broad surfaces 50. Collected light 32 is propagated through the core 62 by total internal refraction, without internal reflection at either broad surface 50. Nevertheless, in the preferred terminology of this written description, the light-confining work of the sheetform 22 is referred to as "superficial" work (ie., of or relating to a surface) because the refractive-index gradient varies from high at the core 62 to low at the surfaces. Hence the properties of the material at the surfaces are involved in light-confining work by this reckoning. In this embodiment, a lens-facet cell can be reckoned as two opposed lenses 42 and their commonly-shared reflective facet 54. This embodiment is expected to find use in space applications where collection from all directions is possible.

FIGS. 4a and 4b show a construction where light-confining work is achieved by internal reflection at both broad surfaces 50 and/or 52. In this embodiment, the lenses 44 are separate parts which must be affixed to the sheetform 22 material on the incident-side broad surface 50 thereof. The incident-side broad surface 50 will have to be clad in a low-refractive index material to allow lens-collected light 32 to transmit through to the reflective facets 54 but otherwise internally reflect interior light 32 (so long as the light rays thereof do not breach the critical angle). In other words, the angle of the reflective facets 54 is set such that light 32 reflects off these facets 54 at greater than the material critical angle, thus ensuring reflection back into the core 46. The broad surface 52 on the non-incident side can be coated with a reflector or clad with a low-refractive index optical material according to designer's choice. Regardless, in this embodiment, both broad surfaces 50 and/or 52 are participating in light-confining work.

Figures 5A, 5B:
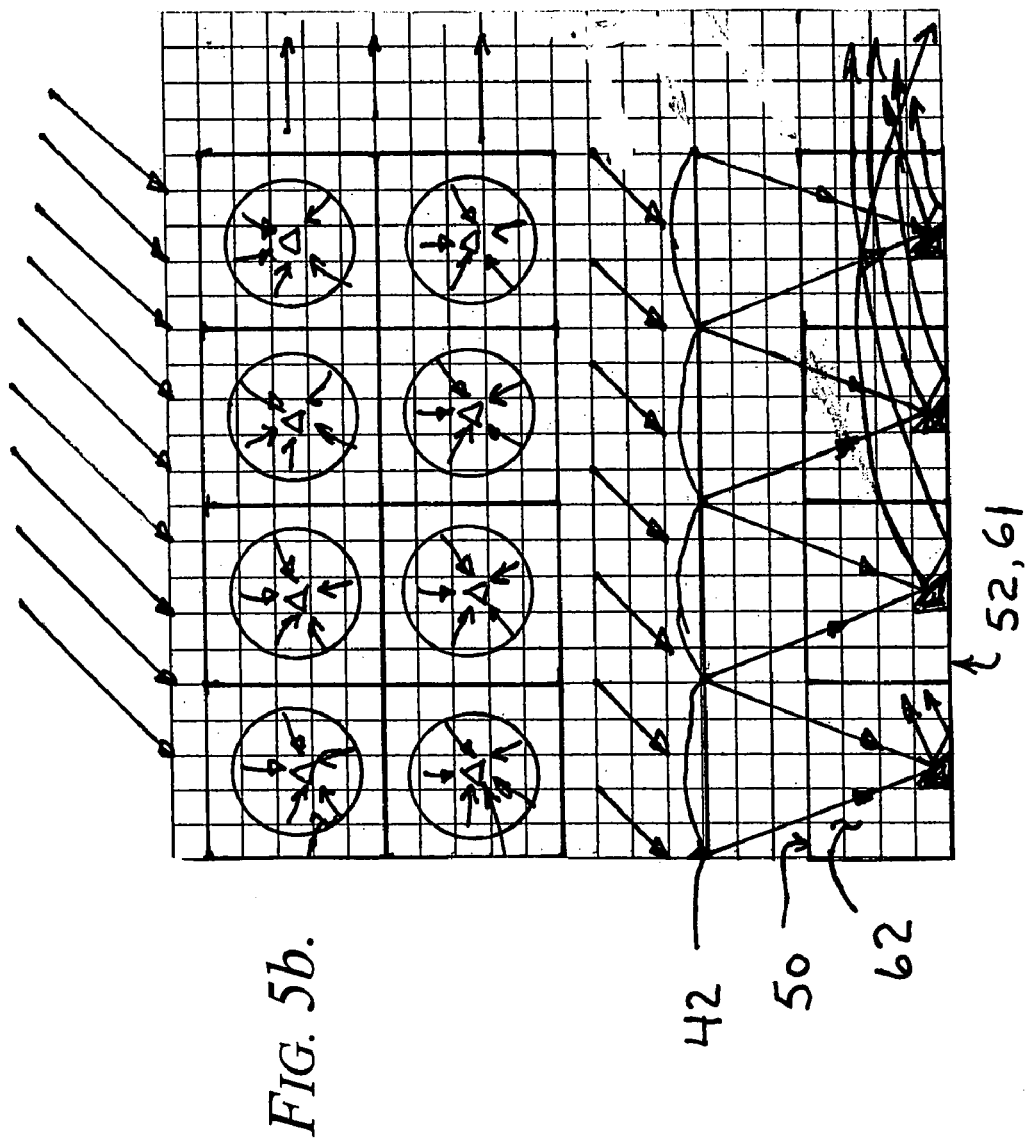
FIG. 5a is an elevational sectional view of a further embodiment of the invention.
FIG. 5b is a top plan view thereof.
Figures 6A, 6B:
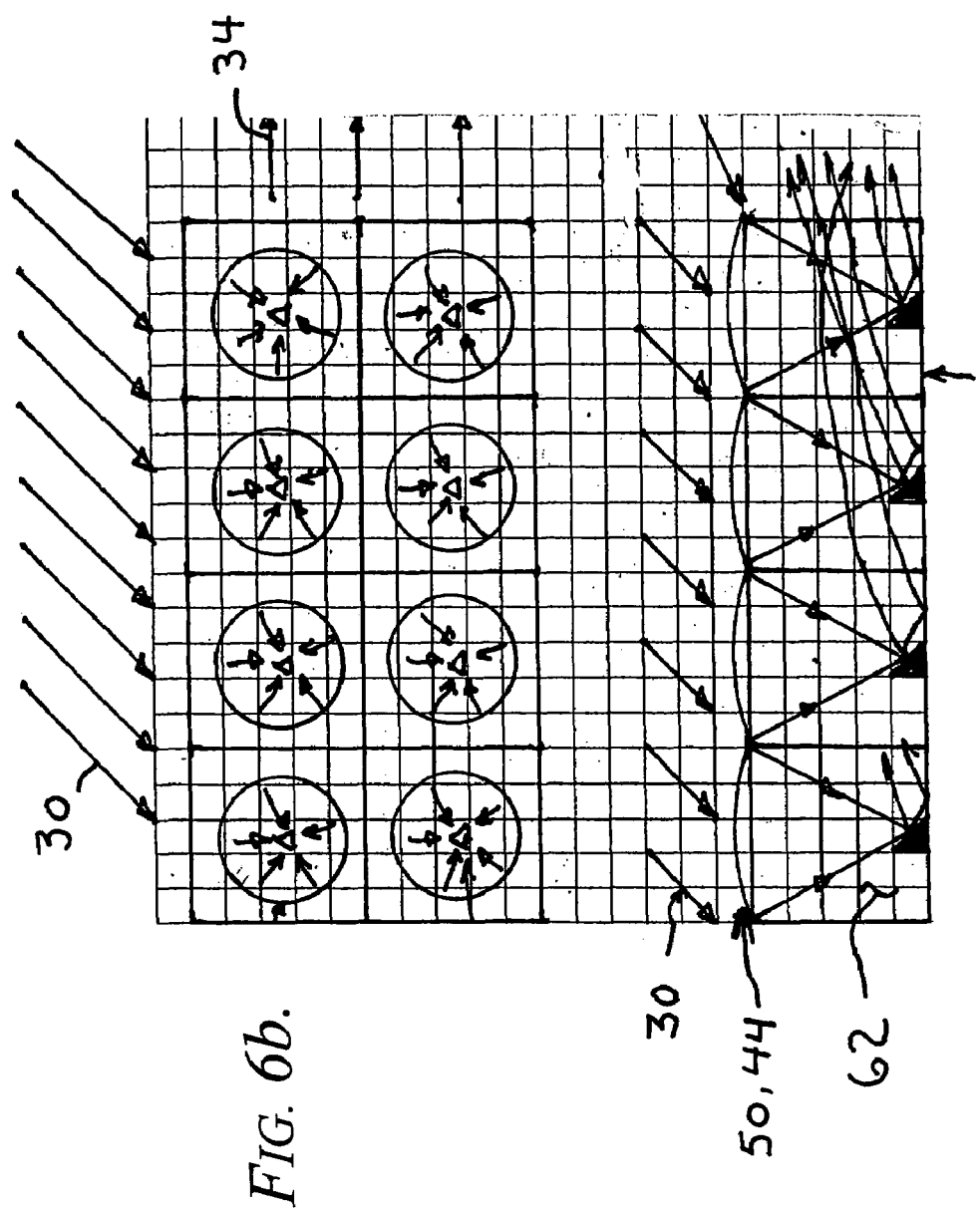
FIG. 6a is an elevational sectional view of another embodiment of the invention.
FIG. 6b is a top plan view thereof.

FIGS. 5a and 5b show a two-piece construction comparable to FIGS. 4a and 4b, or that is, that the sheetform 22 and array 40 of lenses 44 are separate parts that must be assembled together. In contrast, FIGS. 5a and 5b show total internal refraction taking place at the core 62 and total internal reflection taking place at the broad surface 52 opposite the incident-side broad surface 50.

In contrast to FIGS. 5a and 5b, FIGS. 6a and 6b show a one-piece construction wherein the sheetform 22 is produced with lens caps 42 bulging out the incident-side broad surface 50. Comparable to FIGS. 5a and 5b however, the FIGS. 6a and 6b embodiment of the invention show total internal refraction taking place at the core 62 and total internal reflection taking place at the broad surface 52 opposite the incident-side broad surface 50.

FIG. 7 shows the optical apparatus $20^7$ in accordance with the invention fashioned into a jacket button. Collection of external light 30 is undertaken across the surface. Emission of the collected light 32 is provided predominantly at the outer peripheral edge but also along the inner edges of the four stitching holes.

FIG. 8 shows the optical apparatus $20^8$ in accordance with the invention fashioned into a wall plate for an electrical switch plate. This embodiment has an expansive surface for collecting external light 30 and both inner and outer peripheral edges functioning as emission ports 55. Given the additive effect of the light-contribution of lens-facet cell, the strength of the emitted light 34 may very well be stronger than the environment's incident light 30. Alternatively, the optical apparatus $20^8$ might modify the emitted spectra or colors such that the emission ports 55 glow at an attention-grabbing color in order to ensure the showcasing of this wall plate's presence.

Figure 9:
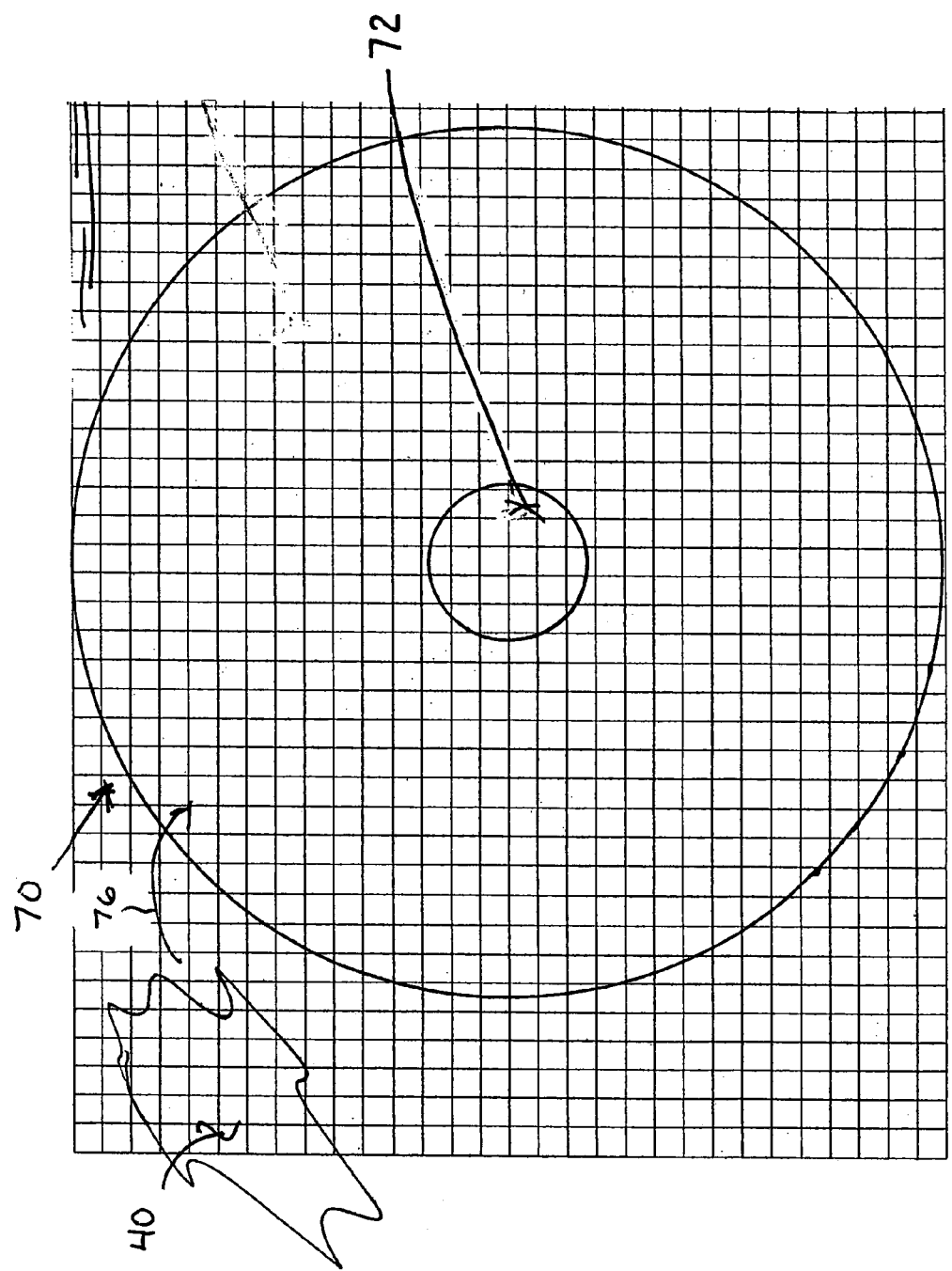
FIG. 9 is a top plan view of the optical apparatus in accordance with the invention in service of heating a solar griddle.

FIG. 9 shows only a sample of the collection surface of such an optical apparatus 20 in accordance with the invention. FIG. 9 shows better a griddle 70 that is supplied heat from the inventive optical apparatus 20 by a fiber optic conductor or light guide 76. In other words, the solar energy collected by the inventive optical apparatus 20 is transferred to the griddle 70 for an end-utilization as a cooking surface. Such utilization is presumed highly advantageous for non-electrified drought-stricken countries in the world which are drenched in sun but starved of fuel for cook fires. The additive energy of the collected sunlight is supplied to a central element 72 where conversion to heat occurs. Food can be cooked directly on this griddle 70, or it can support skillets, pans, or cast-iron (Dutch) ovens and the like. The heat-output of the griddle 70 can be controlled by regulating how much of the collection surface is in the sun. That is, the heat-output can be dialed down by covering a portion of the collection surface with any available shade material, including without limitation fabric, leaves, boards, dirt and so on.

Figure 10:
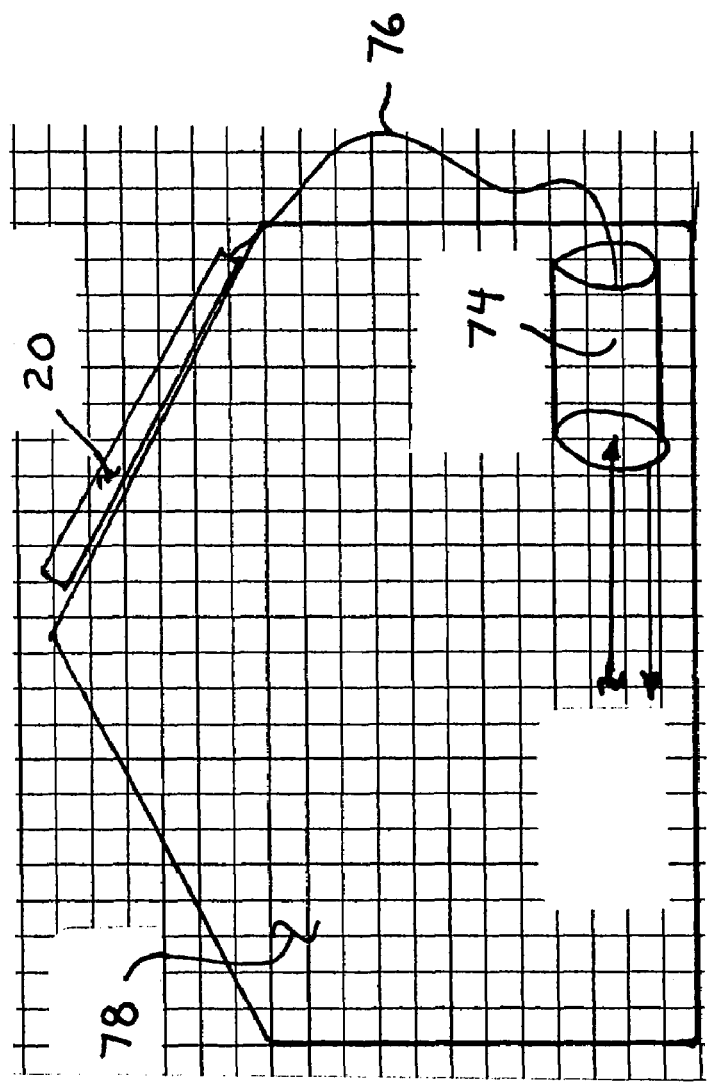
FIG. 10 is an elevational schematic view of the optical apparatus in accordance with the invention fashioned into roof-mounted solar panels for servicing a water heater in a solar-energy home.

FIG. 10 shows the optical apparatus 20 in accordance with the invention fashioned into roof-mounted solar panels for servicing a water heater 74 in a solar-energy home 78. Collected light is transmitted by a fiber optic conductor or light guide 76 to an energy storage unit, which is preferably a tank of water.

FIG. 11 is a perspective view of the optical apparatus $20^{11}$ in accordance with the invention fashioned into an arbitrary hardgood such as, more particularly, a drinking vessel. Hence the sheetform 22 is fashioned into a three-dimensional, non-planar object that collects external light 30 and emits the collected light through the lettering and/or upper and lower peripheral rim edges. If the light-confining work is to be done by reflector-coated surfaces, there is wide latitude into the shapes the sheetform 22 can be contorted into. Conversely, if low-refractive index cladding 61 or refractive-index gradient cores 62 are used, then the factor of the critical angle restricts how tight a radius or the sheetform 22 can be given.

The collected light might be modified by spectral-absorbing properties to subtract or diminish certain spectrums or colors of light so that the emitted color is something different from the collected external light 30. The lettering might spell-out brand-names or the like such that this embodiment of the invention serves as an advertisement.

Suitable materials for the construction of the sheetform 22 and/or lenses 42 or 44 include without limitation glass or plastic. Plastic is likely to be the preferred material for low operating temperatures, such as the jacket button $20^7$ and electric-switch wall plate $20^8$ of FIGS. 7 and 8, because of economy and ease of fabrication. Higher power devices, such as the solar panels of FIGS. 9 and 10, will likely use glass because operating temperatures will likely exceed the abilities of most suitable plastic materials. Since the apparatus 20 is non-image forming, precise manufacturing tolerances are not required in any event.

In operation, incident light is focused onto an array of reflective facets 54 within the sheetform 22. Each reflective facet 54 starts a new family of rays which adds to those previously collected. The net effect is that light 30 is collected over an expansive surface but might be concentrated for transfer to a fiber optic cable or light pipe and so on.

Various techniques are described next which pertain to managing the power output of such optical apparatus 20 in accordance with the invention. This discussion begins with size. Very simply, a larger array of collecting lenses will supply more power than a smaller array of like lenses.

Then there is also the matter of shading. Power output can be managed by shading portions of the array of collecting lenses, and this may range from a technologically-advanced computer-controlled system of opaque shutter to the primitive (eg., throw dirt on it).

Additionally, the reflective facets 54 might be modified. That is, the facets might be constructed to accept or reject light from a specific direction or range of directions, thereby providing a means of control. For example, a non-directional facet might have a circular shape, but a directional facet might have a crescent shape (not shown). Proper modifications of the reflective facets 54 would facilitate capability to track a moving source of incident light without moving the optical apparatus 20 as a whole.

Power output might be managed by manipulating the spectral-absorbing properties of the optical material. If certain spectral bands of the collected light 32 are subtracted before emission, then less than the full available power of the collected light 32 is being delivered at the emission ports 55.

A final remark on power management includes the matter of alignment, especially for planar structures as disclosed by FIG. 1-2 or 10 and so on. Presumptively, the optimal alignment for maximizing power collection (and delivery to the emission ports 55 or 56) is with the external light 30 shining straight down the principal axes of the collecting lenses 42 or 44. Any alignment between the light source and the plane of the collecting lenses which moves away from perpendicular likely reduces the power-collection potential, to the point where if there is too steep an angle almost all of the collectible power of the external light 30 will bypass the planar array of collecting lenses.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. Optical apparatus comprising:
    a web of solid optical material having one and another spaced broad surfaces that together are laterally and longitudinally elongated, as well as are flanking a core;
    superficial light-confining measures flanking the core;
    said one broad surface contoured with a distributed plurality of converging lens formations, each adapted for collecting and introducing incident light rays into the core generally unhampered by said superficial light-confining measures, and converging such onto a focal point or near focal point within said web proximate the other broad surface;
    a plurality of reflective elements embedded within said web for the plurality of lens formations and having bases flush with said other surface, each disposed at the focal point or near focal point for a respective lens, and arranged to deflect the collected light rays onto a transmission path through said web at least generally intermediate the broad surfaces thereof; and
    at least one light-emission port provided in or by said web of optical material that is generally unhampered by said superficial light-confining measures;
    wherein the reflective elements are moreover arranged to initially launch the collected light rays in a targeted direction of the emission port; and
    wherein said superficial light-confining measures generally confine between the broad surfaces the collected and deflected light rays, except for emissions out the emission port.

2. The optical apparatus of claim 1 wherein said superficial light-confining measures comprise coverings or properties for confining the collected and deflected light rays between the broad surfaces thereof by any of total internal reflection or total internal refraction, respectively, or also a combination thereof.

3. The optical apparatus of claim 2 further comprising, for any broad surface participating in confining light in the web by total internal reflection, such broad surface being covered with a coating of a reflector exclusive of the lens formations or emission port, or a cladding of an optical material exclusive of the emission port which has a refractive index lower than that for said core, any of which to prevent films of condensate forming on bare web, that if not prevented is likely to leak confined light.

4. The optical apparatus of claim 2 further comprising providing the properties of the web along at least said one or other broad surface thereof with a refractive-index gradient varying from a low refractive index at said one or other broad surface to a high refractive index interior thereof, whereby said at least one or other broad surface participates in confining light in the web by total internal refraction.

5. The optical apparatus of claim 1 further comprising at least a first and a second emission port spaced apart from one another, and further comprising the reflective elements being moreover arranged such that some of the reflective elements initially launch the collected light rays deflected thereby in a targeted direction of the first emission port, as others of the reflective elements initially launch the collected light rays deflected thereby in a targeted direction of the second emission port.

6. The optical apparatus of claim 5 wherein the embedded reflective elements comprise a flat reflective facet, the orientation of which provides the directionality at which the collected light rays deflected thereby are launched toward a target emission port therefor.

7. The optical apparatus of claim 1 wherein the web of optical material is laterally elongated in continuous rings and longitudinally elongated in U-shaped wickets such that said web of optical material forms an open-topped vessel having an upper rim-edge.

8. The optical apparatus of claim 7 wherein the emission port comprises at least one broad surface being formed with a recess that is sufficiently deep to be generally unhampered by the superficial light-confining measures.

9. The optical apparatus of claim 6 wherein the web of optical material comprises an expanse bounded by an outer peripheral edge, said expanse also being pierced with a through aperture bounded by an inner peripheral edge, and wherein the first emission port comprises a portion of the outer peripheral edge exposing said core generally unhampered by the light-confining measures, as the second emission port comprises a portion of the inner peripheral edge exposing said core generally unhampered by the light-confining measures;

whereby the some facets are oriented to launch the collected light rays deflected thereby in the direction of the first emission port as the other facets are oriented to launch the collected light rays deflected thereby in the direction of the second emission port.

10. Optical apparatus comprising:

a laterally- and longitudinally-elongated sheetform of solid optical material having a core between spaced broad surfaces;

superficial light-confining measures flanking the core;

at least one broad surface contoured with a distribution of converging lens formations adapted for collecting and introducing incident light rays into the core generally unimpeded by the superficial light-confining measures, and converging such onto focal points or near focal points within the sheetform proximate the other broad surface;

a counterpart distribution of reflective elements embedded in the sheetform at the focal points or near focal points, and arranged to deflect the collected, converged rays onto transmission paths through the sheetform generally intermediate the broad surfaces; and at least one light-emission port provided in or by said sheetform of optical material that is rendered generally free of impedance from said superficial light-confining measures;

wherein each reflective element has a flat reflective facet, the orientation of which provides the directionality at which the collected light rays deflected thereby are launched toward a target emission port therefor; and wherein said superficial light-confining measures generally confine light between the broad surfaces, except for emissions out the emission port.

11. The optical apparatus of claim 10 wherein said superficial light-confining measures comprise coverings or properties for confining light between the broad surfaces by any of total internal reflection, total internal refraction, or a combination thereof.

12. The optical apparatus of claim 10 further comprising at least a first and second emission port spaced apart from one another, and further comprising the reflective elements being moreover arranged such that some of the reflective elements initially launch the collected light rays deflected thereby in a targeted direction of the first emission port, as others of the reflective elements initially launch the collected light rays deflected thereby in a targeted direction of the second emission port.

13. The optical apparatus of claim 10 wherein said flat reflective facets have base edges which are flush with said other broad surface for ease of manufacture.

14. The optical apparatus of claim 13 wherein said reflective elements comprise wedge forms.

15. An optical apparatus comprising:

a laterally- and longitudinally-elongated expanse of solid sheetform optical material having a core between spaced broad superficial light-confining measures flanking the core;

at least one broad surface being contoured with a distribution of converging lens formations adapted for collecting and introducing incident light rays into the core generally unimpeded by the superficial light-confining measures, and converging such onto focal points or near focal points within the sheetform;

a counterpart distribution of reflective elements embedded in the sheetform at the focal points or near focal points, and arranged to deflect the collected, converged rays onto transmission paths through the sheetform at least initially along axes generally intermediate the broad surfaces; and at least a first light-emission port and also a second light-emission port spaced apart from one another;

wherein each reflective element has a reflective facet on a fixed incline relative a reference axis therethrough that generally extends perpendicularly through the spaced broad surfaces, the angular orientation of the facet clockwise or counterclockwise about the reference axis therefor providing a measure of directionality at which the collected light rays deflected thereby are launched toward a target emission port therefor; and wherein the reflective elements are moreover arranged such that some of the reflective elements initially launch the collected light rays deflected thereby in a targeted direction of the first emission port, as others of the reflective elements initially launch the collected light rays deflected thereby in a targeted direction of the second emission port.

16. The optical apparatus of claim 15 wherein the core is formed with a refractive-index gradient varying from a low refractive index proximate one or the other broad surface to a high refractive index proximate the other or the one broad surface such that the core confines light in part or in whole by total internal refraction.

17. The optical apparatus of claim 15 wherein the reflective elements comprise wedge forms and the facets comprise a flat surface thereon.

18. The optical apparatus of claim 17 wherein the wedge forms further comprise a base surface which is flush with the other broad surface.

19. The optical apparatus of claim 15 wherein the sheetform of optical material comprises an expanse bounded by an outer peripheral edge, said expanse also being pierced with a through aperture bounded by an inner peripheral edge, and wherein the first emission port comprises all of the outer peripheral edge exposing said core generally unhampered by the light-confining measures, as the second emission port comprises all of the inner peripheral edge exposing said core generally unhampered by the light-confining measures;

whereby the some facets are oriented to launch the collected light rays deflected thereby outwardly only and away from the second emission port.

20. The optical apparatus of claim 19 wherein the collective areas for the first and second emission ports respectively are such that the emissions therefrom represent a concentration of the collections by the collecting lens-formations therefor.

* * * * *